Aug. 7, 1934.   B. HEIN   1,969,711
ROTARY ENGINE
Filed Aug. 27, 1930   4 Sheets-Sheet 1

INVENTOR
BRUNO HEIN,

ATTORNEY

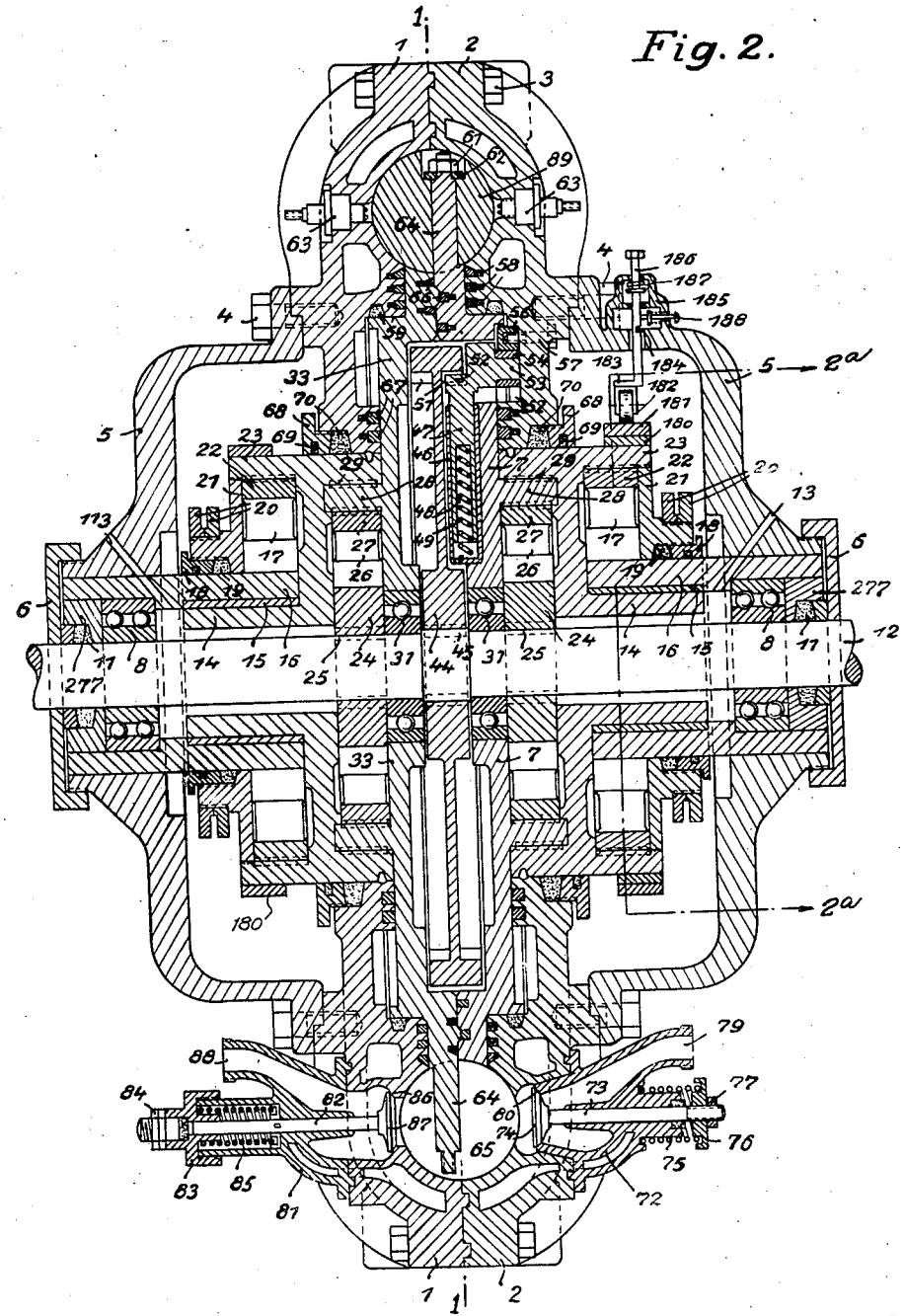

Aug. 7, 1934.   B. HEIN   1,969,711
ROTARY ENGINE
Filed Aug. 27, 1930   4 Sheets-Sheet 3
Fig. 3.   Fig. 4.
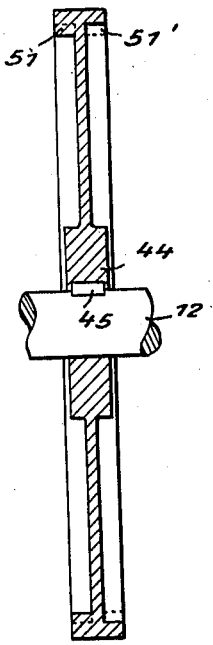
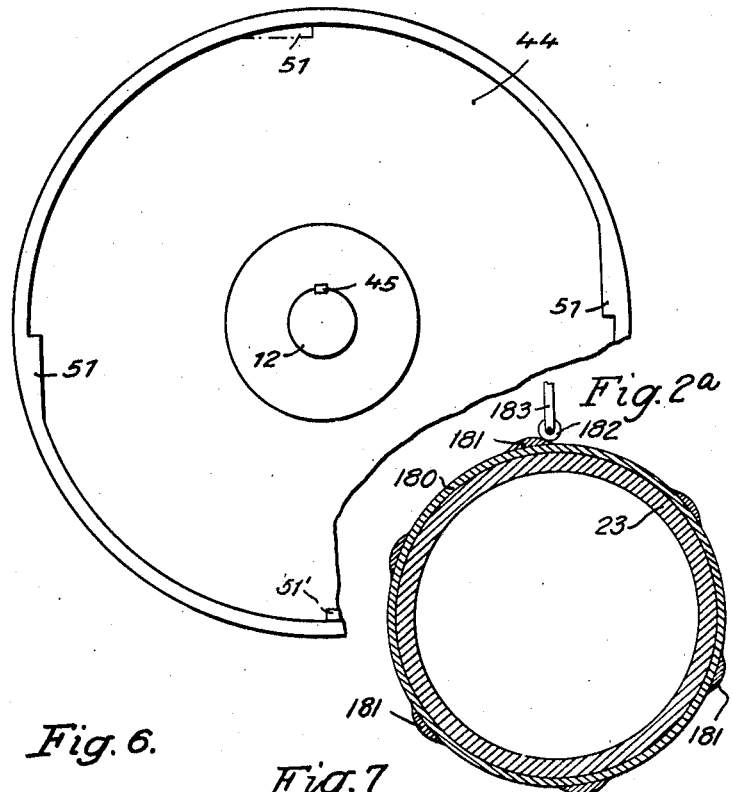
Fig. 5.   Fig. 6.   Fig. 7
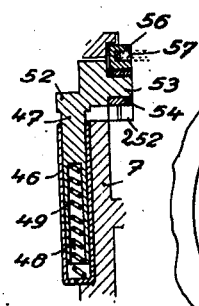
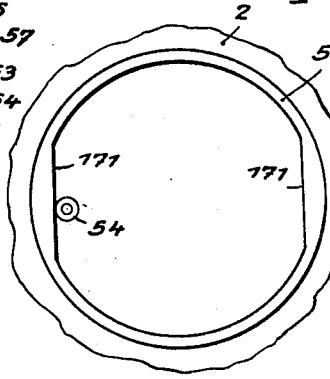
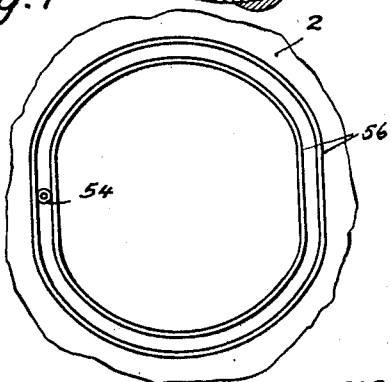
INVENTOR
BRUNO HEIN,
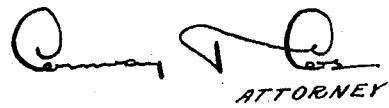
ATTORNEY Aug. 7, 1934.                B. HEIN                1,969,711
                          ROTARY ENGINE
                    Filed Aug. 27, 1930          4 Sheets-Sheet 4

INVENTOR
BRUNO HEIN,

ATTORNEY

Patented Aug. 7, 1934

1,969,711

UNITED STATES PATENT OFFICE

1,969,711

ROTARY ENGINE

Bruno Hein, Iserlohn, Germany

Application August 27, 1930, Serial No. 478,242
In Germany September 2, 1929

9 Claims. (Cl. 123—11)

My invention relates to rotary piston engines, particularly to rotary piston engines with pistons which rotate in an annular chamber and which alternately rotate and are kept stationary on an expansion of the power medium. The stationary piston in this case forms the rear wall of the expansion chamber whilst the piston that forms the front wall is driven forward upon the expansion of the power medium and in doing so performs the useful work. The power medium employed in an engine according to the invention is preferably an explodable air-gas mixture, but water, steam etc. also come into consideration as power media.

A feature of my invention is a rotary piston engine, particularly an internal combustion engine, in which the pistons rotating in the annular chamber are secured to two piston-carrying discs. On each of these discs there are provided two oppositely acting clutches one of which, on an explosion of the power medium, drives the driven shaft in the working direction whilst the other prevents the piston associated therewith from performing a rearward movement. The inner part, carrying the movable clutch members, of the clutch which drives the shaft, is directly secured to the shaft and the outer part is directly secured to the piston-carrying disc; preferably the latter part serves at the same time as a carrier for the outer part of the other clutch which is mounted on the same carrying disc and prevents rearward movement of the piston and the inner part of which is rigidly secured to the casing. When explosion of the compressed air-gas mixture, that is located in one of the spaces between two pistons, takes place, the front piston is driven forward in the working direction and drives the driven shaft by means of one of the two clutches mounted on its carrying disc. The rear piston is, however, prevented from moving backwards because one clutch of its carrying disc then abuts against a stationary part of the engine.

Owing to the alternate movement of the two piston-carrying discs, the introduction and compression of the air-gas mixture as well as the blowing out of the residual gases is effected.

The employment of clutches according to my invention for alternately driving the driven shaft and for preventing a rearward movement has the advantage that the engine works smoothly and with a very high efficiency because the clutches engage in every position without shock and with certainty.

A further feature of my invention is a starting device which consists of a driving plate arranged between the two piston-carrying discs. This driving plate bears cams which engage in corresponding counter-cams on the carrying plates but are disengaged a plurality of times during a rotation. In this way they drive the two piston-carrying discs alternately.

Further features and advantages of my invention may be seen from the accompanying drawings which, together with the description and the claims, form a part of my invention.

Fig. 2 is a longitudinal section on the line 2—2 of Fig. 1;

Fig. 2a is a longitudinal section on the line 2a—2a of Fig. 2 showing the cam ring, cams and roller.

Fig. 2b is an enlarged detail of the cam follower and associated mechanism shown in the right hand corner of Fig. 2.

Fig. 3 shows in cross-section a part of the starting device of the engine;

Fig. 4 is a plan of this part;

Fig. 5 shows in cross-section a further part of the starting device on an enlarged scale;

Fig. 6 shows a plan of part of Fig. 4;

Fig. 7 shows a modified construction of the part shown in Fig. 6;

Fig. 11 shows a further construction of the engine in cross-section;

Fig. 12 shows this construction in longitudinal section, the lower portion only being represented for the sake of simplicity, as the upper portion is in mirror image relation thereto;

Figure 1:
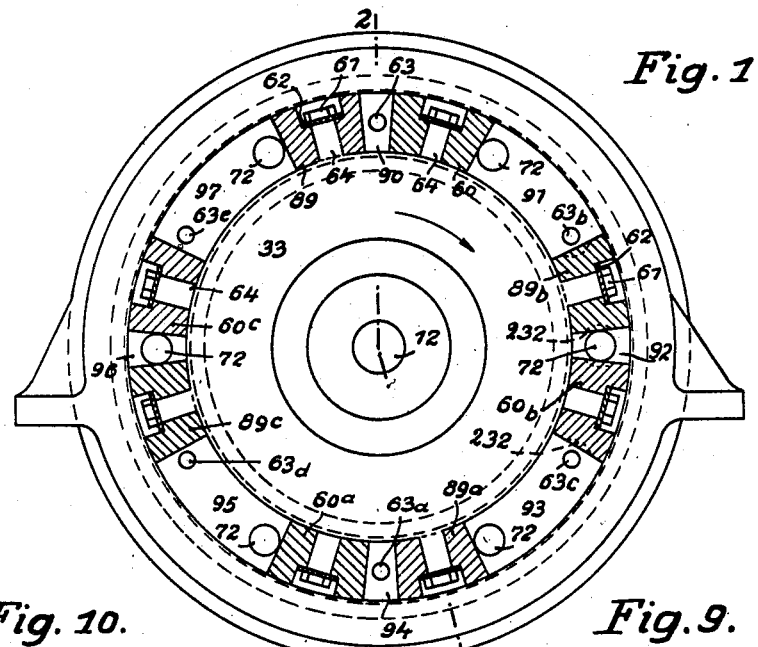
Fig. 1 shows a cross-section through the engine on the line 1—1 of Fig. 2.

As shown in Fig. 2, the casing of the engine consists of the parts 1, 2 and 5. The parts 1 and 5 and also the parts 2 and 5 are connected together by screws 4. The whole is kept together by means of screw bolts 3. The two parts 1 and 2 of the casing form an annular chamber 65 of circular cross-section which is surrounded by a cooling jacket and in which the pistons 60, 60a, 60b and 60c and the pistons 89, 89a, 89b and 89c rotate. The four pistons 60, 60a, 60b and 60c are arranged on a piston-carrying disc 33 at an angular distance of 90° from each other. The pistons 89, 89a, 89b and 89c are similarly fixed on a carrying disc 7. The pistons are constructed as solid pistons and are fitted on pins 64 on the carrying discs 7 and 33 by being screwed thereon with a washer 62 and a nut 61. Recesses 232 may be formed on the pistons in order to enable the pistons 60, 60a, 60b and 60c to be brought closer to the pistons 89, 89a, 89b and 89c at an ignition position and consequently a greater compression to be obtained. The two carrying discs are rotatably mounted on the driven shaft 12 by means of ball bearings 31. In order to pack the annular chamber 65 at the places at which the carrying discs slide on each other, packing rings 66 are provided; similarly packing rings 58 and 67 are arranged for the purpose of packing the annular chamber 65 at the places at which the carrying discs slide on the stationary parts 1 and 2 of the casing. In addition, packing rings 59 are inserted for the purpose of keeping out lubricating oil.

Figure 8:
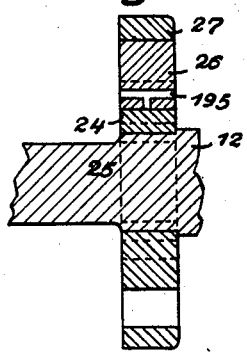
Fig. 8 shows a clutch in cross-section.

Each of the carrying discs 7 and 33 has a bearing flange 28. Into the latter is rigidly fitted the outer part 27 of a clutch; the clutch is shown in detail in Figs. 8 to 10. It consists of the outer part 27 and of the inner part 24 which is secured on the driven shaft 12 by means of keys 25. Inserted into bores of the inner part 24 are movable clutch members 26 which are provided with oil passages 195.

The dimensions of the clutch members 26 are such that the diameter M of the roller bearing 30, the width N at the point of connection of the clutch member 26 to its roller bearing 30 and the length L are to each other in the ratio 3:2:7.5

Figure 10:
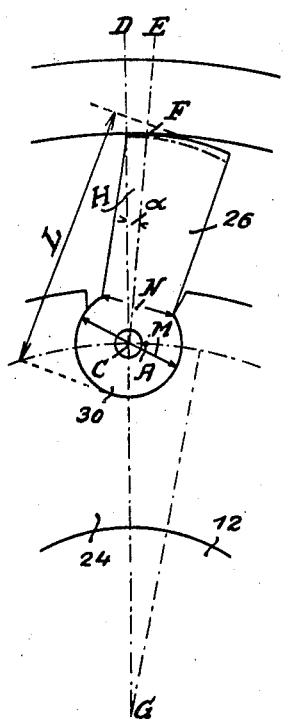
Fig. 10 shows the movable clutch member on an enlarged scale.

As shown in Fig. 10, the clutch member is rotatable about the point C. Its contact surface forms part of a circle having its centre at A. This point A lies upon an arc of a circle having its centre at the point G. The clutch member thus forms part of a roller which oscillates eccentrically about its centre A above the roller 30 and its centre C. The eccentricity of the point A should be such that the angle $\alpha$ between the extension C D of the line joining the centres C and G and the line joining the centre C to the point of contact F of the clutch member amounts approximately to from 6 to 12 degrees. Advantageously the clutch member 26 is extended beyond the point of contact F by a piece H; in this way, splintering off of the contact edge is avoided.

Carriers 297 are inserted into the inner clutch part 24. Each of these carriers carries a spring 299 which engages in a hole 98 of the clutch members 26. The spring tends to press the clutch members round their centre of rotation against the outer part 27. The whole inner clutch is made to run in oil.

Figure 9:
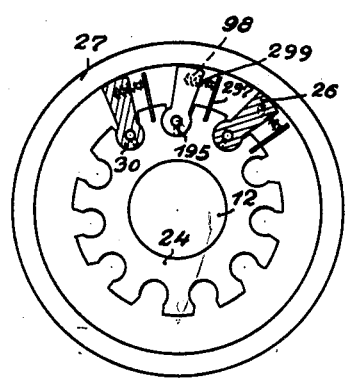
Fig. 9 is a plan of the clutch.

As may be seen from Fig. 9, on the rotation of the outer part 27 in the counter-clockwise direction, the movable clutch members come into engagement, so that the inner clutch part 24, and with it the driven shaft 12, are taken round, whereas this does not take place in the case of the other direction of rotation.

On the outside of each bearing flange 28 there is fitted by means of a key 29 a flange 23 which is packed by means of packing rings 69 and 70 and a screw collar 68. Inserted into this flange 23 is the outer part 22 of a clutch which is constructed in a manner similar to the clutch that has been described. The movable clutch members of this clutch are denoted by 17 and the inner clutch part by 16. The latter is mounted, with the interposition of a bronze bushing 15, on the inner part 14 of the flange 23 and is rigidly secured to the part 5 of the casing. It further carries a ball bearing 8 with which the shaft 12 is mounted. The clutch is closed by a lid 21. Packing rings 19 are inserted into these lids by means of screw collars 18 for the purpose of preventing oil from leaking out.

The two clutches that are fixed on one piston-carrying disc are constructed so as to act in opposite senses, that is to say so that the two inner and the two outer clutches act in the same direction.

For packing the whole engine against oil leakage, there are provided packing rings 11 with retaining collars 277 which are pressed thereto, by the lids 6. The necessary lubricating oil is fed into the engine through the channels 13 by means of a pump. It then runs through the whole of the bearings and clutches and is carried away through the pipe 113.

For starting the engine there is provided a driving plate 44 which is rigidly fixed on the shaft by means of keys 45. This driving plate 44 has a T shaped head provided on one side with a pair of cams 51 and on the other with a pair of cams $51^1$, as shown in Fig. 4. These cams co-operate with a corresponding cam 52 of a piston 47 which is inserted into a cylinder 46. The cylinder 46 is secured to the carrying disc 7. A spring 49, which is inserted into a bore 48 of the piston 47, tends to bring the cam 52 into engagement with a counter cam 51 of the driving plate 44. The piston 47 has thereon a pin 53 upon which a steel roller 54 is rotatably mounted. This steel roller cooperates with a guide rail 56 which is inserted in a recess 252 of the part 2 of the casing and is secured therein by means of screws 57. The shape of this guide rail 56 may be seen in Fig. 6. It consists of a circle which is flattened at two places 171 and on the inside of which the roller 54 runs. As soon as the latter passes from the round portion of the guide to the flattened parts, its path is shortened. Consequently, the guide roller 54 and with it the cam 52 of the piston 47 are pressed downwards, so that the cams 51 and 52 are disengaged.

The guide rail 56 may also have the construction shown in Fig. 7. In this case two rails 56 form a groove in which the guide roller 54 runs. The otherwise circular groove is flattened at a plurality of places 171. On each carrying disc there are provided two cams as hereinbefore described. The cams are arranged at intervals of 90° alternately on the two carrying discs.

If the pistons were able to turn freely, then no compression could be obtained sufficient to start the engine. It is therefore necessary to provide some means for stopping some of the pistons when the engine is to be started. For this purpose, an arrangement is used in which the pistons 89 are yieldingly held against movement when the shaft is turned to start the motor. In this manner, the pistons 60 may be turned to produce a compression between themselves and the stationary pistons 89. The arrangement for accomplishing this holding is shown in Fig. 2.

In order to obtain the necessary compression on starting the engine, a special retaining device is provided. As shown in Figs. 2 and 2a this consists of a cam ring 180 which is mounted on the part 23 and bears six cams 181. Co-operating with this cam ring is a roller 182 which is carried by a bearing 183. The bearing 183 is fixed on a rod 186 mounted in the casing 185. A spring 187 tends to press the rod 186 and with it the roller 182 against the cams 181 of the cam ring. The cams 181 are so distributed on the cam ring that the pistons are held fast at each time at the places where the ignition is to take place by the pressure of a cam against the roller 182. In consequence of the force exerted on starting by the hand or by the starting mechanism, the cam 181 which is at the time being operative, is pushed through below the yielding roller 182 as soon as a predetermined compression which is dependent on the adjustment of the spring 187 is exceeded. If this is the case, the carrying disc is taken along by the retaining device until the next cam is met. The compression produced between the pistons 60 and 89 by the starting movement of the pistons 60 is at first not enough to overcome the pressure of the spring and to force the cam beneath the roller 182. As the piston 60 approaches very close to the piston 89 the compression will become large enough even though no explosion has occurred and the cam 181 will pass beneath the roller 182. The piston 89 will now move forward since it is free to turn until the next cam strikes the roller. This will be repeated until ignition occurs. As soon as an explosion occurs and the engine is started, the roller is driven upwards on account of the great force and velocity then developed, and a spring-controlled pin 188 snaps into a recess 184 of the rod 186, so that the roller is kept raised and out of operation. Without such an arrangement it would be impossible to obtain sufficient compression to open or close the valves.

When the machine is first started, the spring-controlled pin 188 will not enter the recess 184 since the cam 181 passes relatively slow beneath the roller 182. After the machine has started, however, the cams pass quickly below the roller 182 and throw it together with the rod 186 so high that the pin 188 can be pressed into the notch or recess 184.

On each part 5 of the casing two such roller mechanisms are provided the roller devices that co-operate with one cam ring being displaced in relation to the roller devices that co-operate with the other cam ring.

There are provided for introducing the air-gas mixture and leading away the exhaust gases six inlet valves 72 and six exhaust valves 81 which are distributed over the periphery of the walls of the annular chamber 65. Each inlet valve 72 is opposite an exhaust valve 81. The inlet valve 72 has a valve disc 74 which rests on the valve seat 80. The valve spindle 73 is fixed to the valve plate 74. Fitted on the valve spindle 73 is a spring 75 which is compressed by means of a screw nut 77 and a spring cap 76. The spring tends to press the valve plate on to its seat. The direction of opening of the valve is such that, on the opening of the valve, the valve plate moves into the annular chamber 65. The air-gas mixture is supplied by means of the connecting pipe 79 to which the carburetor is connected. The supply connecting pipe may, however, also be directly connected with a compressor.

The exhaust valve 81 likewise consists of a valve disc 87 which rests on the valve seat 86. On the valve spindle 82 there is fitted a spring 85 which is compressed by a spring cap 83 and screw nut 84. The spring tends to press the valve disc 87 on to its seat, the direction of opening of the valve being such that the valve, on opening, moves outwards. The exhaust gases are led away through the pipe 88.

The opening of the inlet valve is effected by the reduced pressure caused by the suction movement of the pistons, whilst the exhaust valve is opened by the pressure of the exhaust gases. A special control of the valves is therefore unnecessary.

A pair of oppositely placed sparking plugs 63 is arranged between each two pairs of valves, so that there are six pairs of sparking plugs in all. The excitation of these sparking plugs is effected in the known way, so that, for the sake of clearness it is neither described nor illustrated. As shown in Fig. 1, the distribution of the oppositely located inlet and exhaust valves (which are indicated by the larger circles) over the periphery of the annular chamber is such that, at the beginning of the compression movement of the pistons, the valves are covered by the pistons in order to prevent the exhaust valvs 81 from being pushed open by the pressure generated on the compression.

As Fig. 1 is a cross-section through the middle of the engine, it only shows the positions for the inlet valves. The valve circles are therefore denoted by 81. The smaller circles denote the sparking plugs 63.

The mode of operation of the engine is as follows:—

As soon as the engine is to be started, the driven shaft 12 is rotated by hand or by means of a starting mechanism. The driving plate 44 is consequently also rotated. As soon as one of its cams—e. g., a cam 51—comes into engagement with a cam 52 on the carrying disc 7 the driving plate 44 drives this carrying disc and the pistons 89, 89a, 89b, and 89c secured thereto and, as soon as the pistons have been rotated to the next ignition place without any ignition of the gas mixture taking place, the guide roller 54 arrives at one of the flat portions 171 of the guide rail, so that the cam 52 is pressed down and the piston-carrying disc 7 is consequently disengaged from the cam 51 of the driving plate. One of the cams $51^1$ of the other side of the driving plate 44 now comes into engagement with one of the cams 52 of the part of the starting device that is located on the piston-carrying disc 33 (this starting device not being shown as it lies in another plane) and drives the piston-carrier 33. After having travelled through a predetermined distance, the piston-carrying disc 33 is again released. This operation is repeated until an ignition of the gas mixture takes place. As soon as this is the case, the piston-carrying discs begin to rotate alternately, so that they no longer require to be driven by the driving plate 44. The latter, however, continues to rotate with the shaft 12 and its cams come alternately into and out of engagement with the cams 52 on the pistons 47. Since, however, in doing this no power transmission is effected and, moreover, the whole starting device runs in oil, no appreciable wear occurs. As soon, however, as the engine tends to stop owing to misfiring or overloading, the starting device again comes into operation and, owing to its stored up kinetic energy, drives the pistons until ignition takes place again.

When the engine has started, the piston-retaining devices, as already mentioned, are put out of operation because the rollers 182 are kept up owing to the snapping of the pin 188 into the recess 184 of the rod 186.

The actual operation of the engine is as follows:—

Let it be assumed that a compressed mixture of air and gas is located in the space 90 between the pistons 89 and 60, then an uncompressed mixture of air and gas will be present in the space 91, no air and gas mixture or exhaust gas will be present in the space 92, exhaust gas will be present in the space 93, a compressed mixture of air and gas will be present in the space 94, an uncompressed air and gas mixture in the space 95, no air and gas mixture or exhaust gas in the space 96, and exhaust gas will be present in the space 97.

On an explosion of the gas mixture in the spaces 90 and 94, the pistons 60 and 60a are driven forward in the direction of the arrow and so drive the shaft 12. The pistons 89 and 89a, however, are prevented from running backwards. The manner in which the driving of the shaft and the prevention of the backward movement are effected will be hereinafter explained.

On a forward movement of the piston 60 (only this piston is here considered as the others behave similarly), not only is the rotation of the shaft 12 effected but this piston at the same time also compresses the air-gas mixture in the space 91. Since, just at the beginning of its movement, it covers the valves 72 and 81, the exhaust valve located in this space is prevented from being pushed open by the excess pressure that is developed. There is thus formed a new compression chamber in which the sparking plug 63b is located. The piston 89b forming the front wall of this chamber cannot be displaced in the working direction because the piston 89 which, together therewith, is fixed on the same carrying disc 7, is kept stationary by the counter-pressure exerted by the explosion gases. The next ignition takes place approximately at the instant at which the compression pressure of the fresh gases and the counter-pressure of the exploded gases become equal to each other. By adjusting the point of time at which ignition takes place the degree of the resulting compression can thus be predetermined at the same time.

Simultaneously with the movement of the piston 60, the piston 60b mounted on the same carrying disc 33 is moved forward. Consequently, there is produced in the space 92 a reduced pressure by means of which the inlet valve located in this space is opened, so that fresh mixture is sucked in, whereas in the space 93 there is produced an increase of pressure by means of which the exhaust valve located in this space is pushed open, so that the exhaust gases can escape.

This cycle of operations is repeated continually. The first formation of mixture and production of compression are brought about by the rotation of the piston-carriers with the pistons by the driving plate 44. Before the engine rotates, however, the piston which at the time being forms the front wall is not kept stationary by the counter-pressure exerted by the exploding gases upon another piston mounted on the same carrying disc; this is then effected by the retaining device hereinbefore described.

The transmission of the movement of the pistons to the shaft 12 and the retention of the pistons are effected in the following manner.

As soon as, for example, the piston 89 is driven forward in the working direction, the outer part 27 of its clutch comes, owing to the movable clutch members 26, into engagement with the inner clutch part 24 which is fixed on the shaft 12 and the latter is thus driven in the working direction. As soon as the piston 60, which forms the rear wall of the explosion chamber and which is mounted on the other carrying disc, attempts to perform a backward movement, the outer clutch in the case of this carrying disc comes into engagement with the part 5 of the casing. Consequently the carrying disc can no longer move backwards with the pistons secured thereto. Each piston can, as on the occurrence of an explosion, rotate in the working direction and so drive the shaft 12, but cannot rotate in the opposite direction.

The embodiment represented by Figs. 11 and 12 agrees essentially, as regards principle, construction of the clutches and of the starting device etc., with the embodiment shown in Figs. 1 and 2. 91' is a cooling chamber. The extension 53 of the starting device is differently formed, but this difference is of no importance to the invention. The pistons 60 and 60a as well as 89 and 89a are constructed as hollow pistons.

In the case of the engine according to Figs. 11 and 12, however, only a single pair of pistons is provided on each of the piston-carrying discs 7 and 33. Consequently the piston—e. g., the piston 89—which forms the front wall of the compression chamber is not kept stationary by the counter-pressure exerted upon another piston, which is mounted on the same piston-carrying disc as itself, when the piston 60 approaches it and in doing so compresses the gas mixture that is located between the two pistons. A special device is therefore necessary for the development of the compression. This consists of a stopping disc 138 which is keyed on the part 23. The stopping surface bears a cam 141 with a long sloping surface in order to produce a shockless stoppage. The stopping disc co-operates with a cylinder 137, into the fork-like end of which a roller 139 is inserted by means of a bolt 140. This roller 139 is, like the counter-roller 149, advantageously covered with raw hide for the purpose of deadening noise. The cylinder 137 can be pressed to a greater or smaller extent towards the cam 141 by means of a spring plate 134 and a setting wheel 135. Advantageously, all the setting wheels 135 are connected together by some motive means, so that the four cylinders 137 can be adjusted from one position. The pistons which form the front wall of the expansion chamber are, during the compression, kept stationary by the cylinders 137 and the disc 138, so that in this way the magnitude of the stopping action determines the degree of compression, which is consequently easily regulated.

Fig. 11 further shows the connecting pipes 172 and 172a for the inlet valves and the connecting pipes 173 and 173a for the exhaust valves. 63 and 63a are the sparking plugs which are each connected to a magneto ignition device. The valves and the sparking plugs are controlled by means of a lever device known per se and the cams 20, 156 and 157 which are fitted on the clutch part 23.

Again, in the case of this construction, special cooling devices are provided. The cooling medium—e. g., oil—is supplied through the pipe 199, runs through the various clutches and bearings, and, as the result of centrifugal force, arrives by way of the pipe 160 into the interior of the pistons which are entirely, or almost entirely, filled with oil. A discharge device 161 is provided in each piston. Owing to inertia, the oil is driven, by the jerk when the piston is stopped, into this discharge device and then flows through the pipe 162 into an oil groove 177. From this oil groove, the oil flows away through the pipe 178 and the elbow pipe 179.

Figure 13:
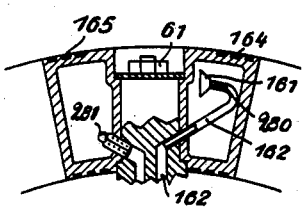
Fig. 13 represents on an enlarged scale a hollow piston with a part of the cooling device.

Fig. 13 shows a hollow piston and a discharge device on an enlarged scale. The discharge device consists of a funnel 161 which occupies approximately the whole width of the hollow space of the piston. The mouth of the funnel faces the direction of rotation of the piston which is indicated by an arrow, so that, when the piston is stopped, the oil is driven into the funnel. The discharge pipe 162 is connected to the funnel 161. For the purpose of preventing the oil from flowing back through the discharge pipe, the latter is fitted with a ball valve 280 which only allows the oil to flow out but prevents it from flowing in; similarly, there is provided in the supply pipe 160 a ball valve 281 which prevents an undesired discharge of oil through this pipe. The piston rings are denoted by 164 and 165.

The mode of operation of the engine shown in Figs. 11 and 12 is as follows: —

The starting operation is carried out in a manner similar to that described in connection with the construction according to Figs. 1 and 2. As soon as the stopping disc 138 pertaining to the pistons 60 and 60a encounters the braking cylinder 137, the pistons 60 and 60a, which were previously pushed in front of the pistons 89 and 89a are stopped, with the result that compression ensues. When, according to the adjustment of the cylinder 137, a compression pressure of from 5 to 8 atmospheres is reached, ignition takes place. The explosion overcomes the stopping action and drives the two pistons 60 and 60a forward in the direction of the arrow, with the result that these pistons drive the shaft 12 in the manner described in connection with Figs. 1 and 2; the two other pistons, on the other hand, are stopped in the manner described in connection with Figs. 1 and 2.

The exhaust gases are forced out through the exhaust valves 173 and 173a. The pistons, which are still in motion, compress the freshly blown in or sucked in mixture, the pistons 89 and 89a now being retained by the stopping device. The operation is then repeated. The control of the valves is effected, as already mentioned, in the known way with the aid of the cams 20, 156 and 157.

My invention can also have many other constructional embodiments without departing from the essence of the invention. The scope of my invention should therefore not be limited to the examples represented.

What I claim and desire to secure by Letters Patent of the United States of America is:—

1. A rotary piston engine comprising a casing an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, clutch members pivotally mounted in said inner part and adapted to come, upon movement in one direction, into engagement with said outer part, and a disc mounted on each of said carrying discs, having a plurality of cam surfaces thereon, a roller engaging each of said cam discs, and means to urge said rollers against said discs.

2. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, and clutch members pivotally mounted in said inner part and adapted to come, upon movement in one direction, into engagement with said outer part, said pistons being hollow, a conduit in each piston to supply cooling material thereto, a second conduit to lead off cooling material from the piston, and a funnel connected to said second conduit and having its mouth opening within the hollow portion of the piston and turned in a direction opposite the direction of movement of the piston.

3. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, and clutch members pivotally mounted in said inner part and adapted to come, upon movement in one direction, into engagement with said outer part, said pistons being hollow, a conduit in each piston to supply cooling material thereto, a second conduit to lead off cooling material from the piston, and a funnel connected to said second conduit and having its mouth opening within the hollow portion of the piston and turned in a direction opposite the direction of movement of the piston, and a non-return valve in said second conduit.

4. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, clutch members pivotally mounted in said inner part and adapted to come, upon movement in one direction, into engagement with said outer part, a driving plate mounted between said carrying discs rigidly mounted on the driven shaft, cams on the sides of said driving plates at positions corresponding to the ignition positions of the pistons, the cams on one side of the plate being circumferentially displaced with respect to the cams on the other side, radially displaceable catches arranged on each piston carrying disc and adapted to be moved alternatingly by the said cams, and means to displace said catches a plurality of times during a revolution of the carrying disc.

5. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, clutch members pivotally mounted in said inner part and adapted to come, upon movement in one direction, into engagement with said outer part, a driving plate mounted between said carrying discs rigidly mounted on the driven shaft, cams on the sides of said driving plates at positions corresponding to the ignition positions of the pistons, the cams on one side of the plate being circumferentially displaced with respect to the cams on the other side, radially displaceable catches arranged on each piston carrying disc and adapted to be moved alternatingly by the said cams, and means to displace said catches a plurality of times during a revolution of the carrying disc, said means comprising a circular guide rail fixed on said casing opposite each carrying disc, a plurality of flattened portions in said guide rail, and means on said catches to engage said guide rail to be guided thereby.

6. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, clutch members pivotally mounted in said inner part and adapted to come, upon movement in one direction, into engagement with said outer part, said means for igniting the power medium comprising a plurality of ignition elements, a disc mounted on each of said carrying discs, having a plurality of cam surfaces thereon, the number of cam surfaces being equal to the number of ignition elements, a plurality of rollers engaging the surfaces of each of said cam discs, and means yieldingly holding said rollers in engagement with said discs.

7. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, clutch members pivotally mounted in said inner part and adapted to come, upon movement in one direction, into engagement with said outer part, said means for igniting the power medium comprising a plurality of ignition elements, a disc mounted on each of said carrying discs, having a plurality of cam surfaces thereon, the number of cam surfaces being equal to the number of ignition elements, a plurality of rollers engaging the surfaces of each of said cam discs, and means yieldingly holding said rollers in engagement with said discs, the roller engaging one of said discs being circumferentially displaced with respect to the rollers which engage the other discs.

8. A rotary piston engine comprising a casing, an annular chamber in said casing, means for introducing a power medium into said annular chamber, means of igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, clutch members pivotally mounted in said inner part and adapted to come, upon movement in one direction, into engagement with said outer part, said means for igniting the power medium comprising a plurality of ignition elements, a disc mounted on each of said carrying discs, having a plurality of cam surfaces thereon, the number of cam surfaces being equal to the number of ignition elements, a plurality of rollers engaging the surfaces of each of said cam discs, and means yieldingly holding said rollers in engagement with said discs, and means for retaining the rollers in a position out of engagement with the discs as soon as the speed of the discs exceeds a given amount.

9. A rotary piston engine comprising a casing, an annular chamber in said casing, means for introducing a power medium into said annular chamber, means for igniting said power medium, means for leading off the exhaust gases, a driven shaft, a pair of carrying discs mounted on the shaft, a plurality of pistons rotating in said annular chamber and secured to said carrying discs, on each carrying disc two oppositely acting clutches one of which is adapted to engage the driven shaft on its rotation in the working direction and the other of which is adapted to engage a fixed part of the engine on rearward movement of the piston carrier, each of said clutches consisting of both an inner part and an outer part, the inner part of the first clutch being secured to the shaft, the outer part being secured on the disc, the inner part of the second clutch being secured on the casing, the outer part being mounted on the outer part of the first clutch, clutch members pivotally mounted in said inner part and adapted to come, upon movement in one direction, into engagement with said outer part, said means for igniting the power medium comprising a plurality of ignition elements, a disc mounted on each of said carrying discs, having a plurality of cam surfaces thereon, the number of cam surfaces being equal to the number of ignition elements, a plurality of rollers engaging the surfaces of each of said cam discs, and means yieldingly holding said rollers in engagement with said discs, and means for retaining the rollers in a position out of engagement with the discs as soon as the speed of the discs exceeds a given amount, said means comprising an extension supporting said roller and having a recess therein, and a spring catch adapted to engage said recess when said roller is raised a predetermined amount by the force of rotation of the disc.

BRUNO HEIN.